United States Patent
Kokku et al.

(10) Patent No.: US 8,345,545 B2
(45) Date of Patent: Jan. 1, 2013

(54) METHODS AND SYSTEMS FOR RATE MATCHING AND RATE SHAPING IN A WIRELESS NETWORK

(75) Inventors: Ravindranath Kokku, Monmouth Junction, NJ (US); Rajesh Mahindra, Highland Park, NJ (US); Honghai Zhang, Ewing, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 364 days.

(21) Appl. No.: 12/685,342

(22) Filed: Jan. 11, 2010

(65) Prior Publication Data
US 2010/0189063 A1 Jul. 29, 2010

Related U.S. Application Data

(60) Provisional application No. 61/147,852, filed on Jan. 28, 2009, provisional application No. 61/236,703, filed on Aug. 25, 2009.

(51) Int. Cl.
*G06F 11/00* (2006.01)
*H04L 12/26* (2006.01)

(52) U.S. Cl. .................................. 370/229; 370/252
(58) Field of Classification Search .................. 370/229, 370/231, 232, 235, 464, 465; 709/224, 225, 709/226, 228, 229
See application file for complete search history.

(56) References Cited

U.S. PATENT DOCUMENTS

| | | | | |
|---|---|---|---|---|
| 7,342,880 B2* | 3/2008 | Yanagihara et al. | ......... | 370/232 |
| 7,609,634 B2 | 10/2009 | Chow | | |
| 7,701,851 B2* | 4/2010 | Chakareski et al. | ......... | 370/231 |
| 2003/0198184 A1* | 10/2003 | Huang et al. | ................. | 370/231 |
| 2005/0025158 A1 | 2/2005 | Ishikawa et al. | | |
| 2006/0164987 A1* | 7/2006 | Ruiz Floriach et al. | ...... | 370/235 |
| 2007/0091805 A1 | 4/2007 | Ramprashad et al. | | |
| 2007/0201500 A1* | 8/2007 | Deshpande | ................... | 370/412 |

OTHER PUBLICATIONS

Burza, M., et al. Adaptive Streaming of MPEG-Based Audio/Video Content Over Wireless Networks. Journal of Multimedia. vol. 2, No. 2. Apr. 2007. pp. 17-27.

Liebel, G., et al. Advanced Wireless Multiuser Video Streaming Using the Scalable Video Coding Extensions of H.264/MPEG4-AVC. 2006 IEEE. 2006 International Conference on Multimedia & Expo. Jul. 2006. pp. 625-628.

Lu, M., et al. Video Streaming Over 802,11 WLAN With Content-Aware Adaptive Retry. 2005 IEEE. Proceedings of the 2005 IEEE International Conference on Multimedia and Expo. Jul. 2005. (4 Pages).

* cited by examiner

*Primary Examiner* — Warner Wong
(74) *Attorney, Agent, or Firm* — Joseph Kolodka; James Bitetto

(57) ABSTRACT

Rate matching and rate shaping methods and systems for managing data traffic on wireless channels are disclosed. Rate matching embodiments dynamically determine downlink video data transmission rates based on frame decoding deadlines and frame sizes. In addition, if the channel capacity cannot support the video data transmission rate, the rate matcher can adjust the video stream accordingly so that it is supportable by the channel capacity. In turn, rate shaping implementations can tailor the transmission rate shaping based on the state of the wireless data channel. Shaper operations can be specifically adapted to a saturated state of the wireless channel, to an unsaturated state of the wireless channel and to transitions between the unsaturated and saturated states.

11 Claims, 7 Drawing Sheets

α slightly more than 1
β slightly more than 1

METHODS AND SYSTEMS FOR RATE MATCHING AND RATE SHAPING IN A WIRELESS NETWORK

RELATED APPLICATION INFORMATION

This application claims priority to provisional application Ser. No. 61/147,852 filed on Jan. 28, 2009 and provisional application Ser. No. 61/236,703 filed on Aug. 25, 2009, both of which are incorporated herein by reference.

BACKGROUND

1. Technical Field

The present invention relates to data stream transmission management and, more particularly, to managing the transmission of a data stream between a wired and a wireless network.

2. Description of the Related Art

In recent years, due to the popularity of mobile devices, there has been a significant proliferation of wireless networks such as 3G/4G wireless networks, WiMAX (Worldwide Interoperability for Microwave Access) and WiFi (Wireless Fidelity) networks and others. In particular, there has been considerable interest in managing transmission rates over wireless networks that are used as a "last mile" connection between mobile devices and wired networks. Management of transmission rates on the "last mile" is important, as bandwidth or capacity on wireless networks is usually much lower than the bandwidth available on the wired portion of the connection. Typically, rate matching and rate shaping methods are used to address capacity limitations on wireless data links.

In the context of video and audio traffic, rate matching adaptive techniques can be categorized into end-to-end, dynamic in-network transcoding and base station scheduling approaches. End-to-end approaches typically feedback link capacity characteristics or video/audio quality metrics from the client mobile device to the source to enable the source to lower the video/audio rate to minimize video/audio distortion. Conversely, dynamic in-network transcoding approaches perform transcoding based on feedback at an intermediate node in the wired network.

Various rate shaping methods have been developed to partly address the capacity mismatch between wired networks and wireless networks, especially in the context of differentiated services. For example, certain shapers determine priorities for dropping packets at downstream Internet nodes (i.e. routers) if network capacity is scarce. In these works, the goal is to smooth traffic based on a minimum and maximum rate promised to the user.

SUMMARY

While prior approaches address the capacity mismatch between wired and wireless networks to a limited extent, the approaches are still inundated with several problems. For example, end-to-end rate matching approaches can only match the video quality to the average capacity of the end-to-end link at coarse timescales, and are thus ineffective in handling fine-timescale fluctuations on wireless channels. In addition, dynamic in-network transcoding approaches incur substantial transcoding overhead and also cannot adapt the transcoding rapidly to fine-timescale fluctuations on wireless channels. Furthermore, known rate shaping methods are not based on the available capacity of a bottleneck router, which would provide an accurate estimation of the fluctuating capacity in the wireless data channel. Even adaptive rate shapers adjust the rate of the shaper based on the incoming traffic and do not base the shaper rate on fluctuating capacity.

Exemplary embodiments of the present invention address the deficiencies of the prior art by providing rate matching and shaping methods that manage the downlink data transmission rate in accordance with the instantaneous available wireless channel capacity, thereby dynamically adapting the transmission rate to wireless channel capacity variations.

One exemplary embodiment of the present invention includes a method for transmitting a video stream or a portion of a video stream by considering the variable capacity of a data link. In accordance with this exemplary method, the data link throughput can be estimated and the video transmission rate for the video stream can be calculated. Here, the transmission rate can be calculated by determining an instantaneous rate for each frame in a set of frames of the video stream and selecting a highest instantaneous rate among the instantaneous rates. An instantaneous rate for a given frame can be determined by accumulating the size of the given frame with sizes of preceding frames in the set that are arranged in accordance with corresponding frame deadlines at a receiver. In addition, in response to determining that the estimated data link throughput is insufficient to support the video transmission rate, the video stream can be modified and transmitted such that the video stream is supportable by the data link throughput.

Another exemplary embodiment of the present invention can include a method for dequeueing a storage buffer at a gateway between a wired network and a wireless network for the transmission of a data stream. The method can include monitoring throughput on a data link in the wireless network to determine an available capacity on the data link and to determine whether the data link is unsaturated or saturated. For one or more time intervals in which the data link is unsaturated, a dequeueing rate can be set as the maximum value between the dequeueing rate in a preceding time interval and a capacity rate that is a fraction above the available capacity on the data link in the preceding time interval. Further, for one or more time intervals in which the data link is saturated, the dequeueing rate can be set as the minimum value between a predetermined maximum rate and a capacity rate that is a fraction above the available capacity on the data link in a preceding time interval. The storage buffer may be dequeued at the dequeueing rate to transmit the data stream across the wireless network.

An alternate embodiment of the present invention can include a system for managing the transmission of a data stream between a wired network and a wireless network. The system may include a storage buffer configured to store portions of the data stream. The system may further include a capacity monitor module configured to monitor throughput on a data link in the wireless network to determine an available capacity on the data link and to determine whether the data link is unsaturated or saturated. In addition, the system may further comprise a rate shaper. When the data link is unsaturated, the rate shaper can set a dequeueing rate as the maximum value between the dequeueing rate in a preceding time interval and a capacity rate that is a fraction above the available capacity on the data link in the preceding time interval. Conversely, when the data link is unsaturated, the rate shaper may set the dequeueing rate as the maximum value between a predetermined maximum rate and a capacity rate that is a fraction above the available capacity on the data link in a preceding time interval. The rate shaper may also be configured to dequeue the storage buffer at the dequeueing rate to transmit the data stream across the wireless network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with exemplary embodiments of the present invention, rate matching and shaping methods and systems can manage the downlink data transmission rate in accordance with the instantaneous available wireless channel capacity, thereby adapting to variations induced by channel fading, shadowing, user mobility, etc., at fine timescales. Specifically, exemplary rate matching methods and systems can compute the transmission rate for video data based on both decoding deadlines and frame sizes. Furthermore, in accordance with exemplary rate matching approaches discussed herein below, the determination of the network capacity needed to service a mobile client can be dependent on any frame, not necessarily the last frame, in the frame buffer of a control unit near the wired-to wireless transition point. In addition, exemplary rate shaping methods may employ a two-state joint probing and shaping scheme that permits rapid convergence to the appropriate shaper rate setting in accordance with the determined network capacity on the wireless data link. It should also be noted that rapid convergence is facilitated by novel operations that are performed during transitions between states in addition to operations performed while the shaper is in either of the two states. Moreover, the rate shaping methods can solve the problem of priority inversion across flows of different priorities that past solutions cannot solve.

In the particular embodiments discussed herein below, the rate matchers and rate shapers can be implemented as a multimedia edge service architecture (MESA) for enhanced video transmission over wireless networks. Performing rate matching as a service at the wired-wireless edge (transition point) achieves high accuracy, facilitates immediate deployment, and enables a generic design applicable to several wireless technologies with the augmentation of a few technology-specific mechanisms. For example, being close to the wireless channel, MESA can make an intelligent choice of which frames to transmit based on the available channel capacity at fine timescales, resulting in minimum distortion in video quality. In addition, because MESA can be deployed as an edge service, it need not be dependent on the specific wireless channel access technology employed, such as WiMAX, WiFi or LTE (long term evolution). In MESA, or equivalently, the "control unit" referred to herein below, a systematic combination of three components can be used: a novel per-frame rate matching process, a pre-buffering approach, and an adaptive probing and shaping mechanism, all of which can achieve accurate rate matching.

Figure 1:
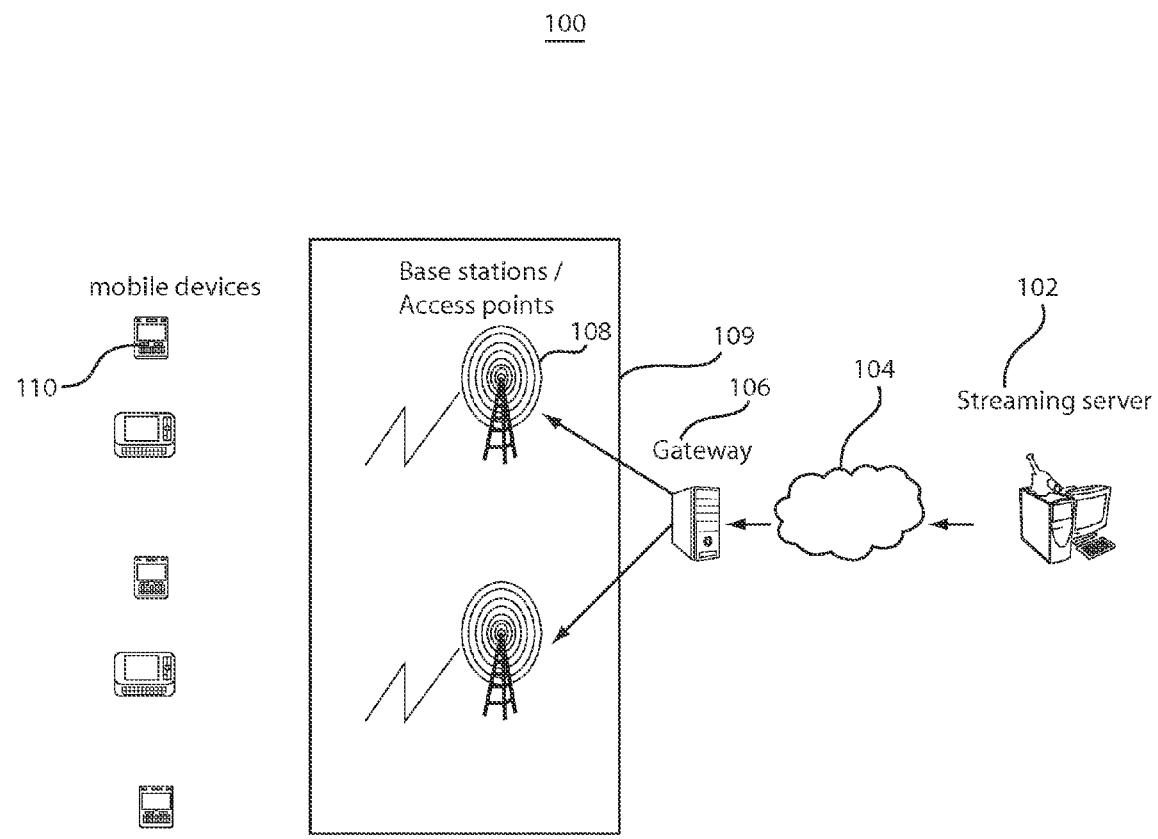
FIG. 1 is a block/flow diagram of an exemplary network in which embodiments of the present invention can be implemented.

Referring now in detail to the figures in which like numerals represent the same or similar elements and initially to FIG. 1, a system 100 in which exemplary embodiments of the present invention described herein below can be implemented is illustrated. System 100 may comprise a streaming server 102 that streams data, such as video data, across a wired wide area network 104 and a wireless network 109 to mobile devices 110. As shown in FIG. 1, the wireless network 109 may include base stations or access points 108 for communicating wirelessly to mobile devices 110. Further, the wireless network 109 may be connected to the wired wide area network 104 via a gateway 106. It should be noted that although system 100 is illustrated primarily with respect to downlink operations, exemplary embodiments of the present invention can also be applied to uplink communications if the control unit is sufficiently close to the base station or access point so that it can instruct the mobile devices to truncate the source video quickly. Thus, the streaming servers or mobile devices can be video senders and, conversely, the mobile devices or Internet clients can be video receivers.

In the example illustrated in FIG. 1, the streaming server 102 may transmit video data to the mobile devices through the internet, Gateways, and Base stations (for cellular networks) or access points (for WiFi and other networks). In another example, mobile devices may transmit video data to Internet or other mobile devices. The exemplary methods and systems disclosed herein may be implemented in video control units, which can reside anywhere on the path from the senders to the receivers, including mobile devices, base stations, access points, gateways, or even in the streaming servers.

In the example of transmitting video from a streaming server to mobile devices, if the video control units are not implemented in the base stations, access points, or gateways, the base stations, access points or gateways can feedback the channel state information of the mobile devices receiving the video to the control units on the servers where the methods and systems are implemented.

Figure 2:
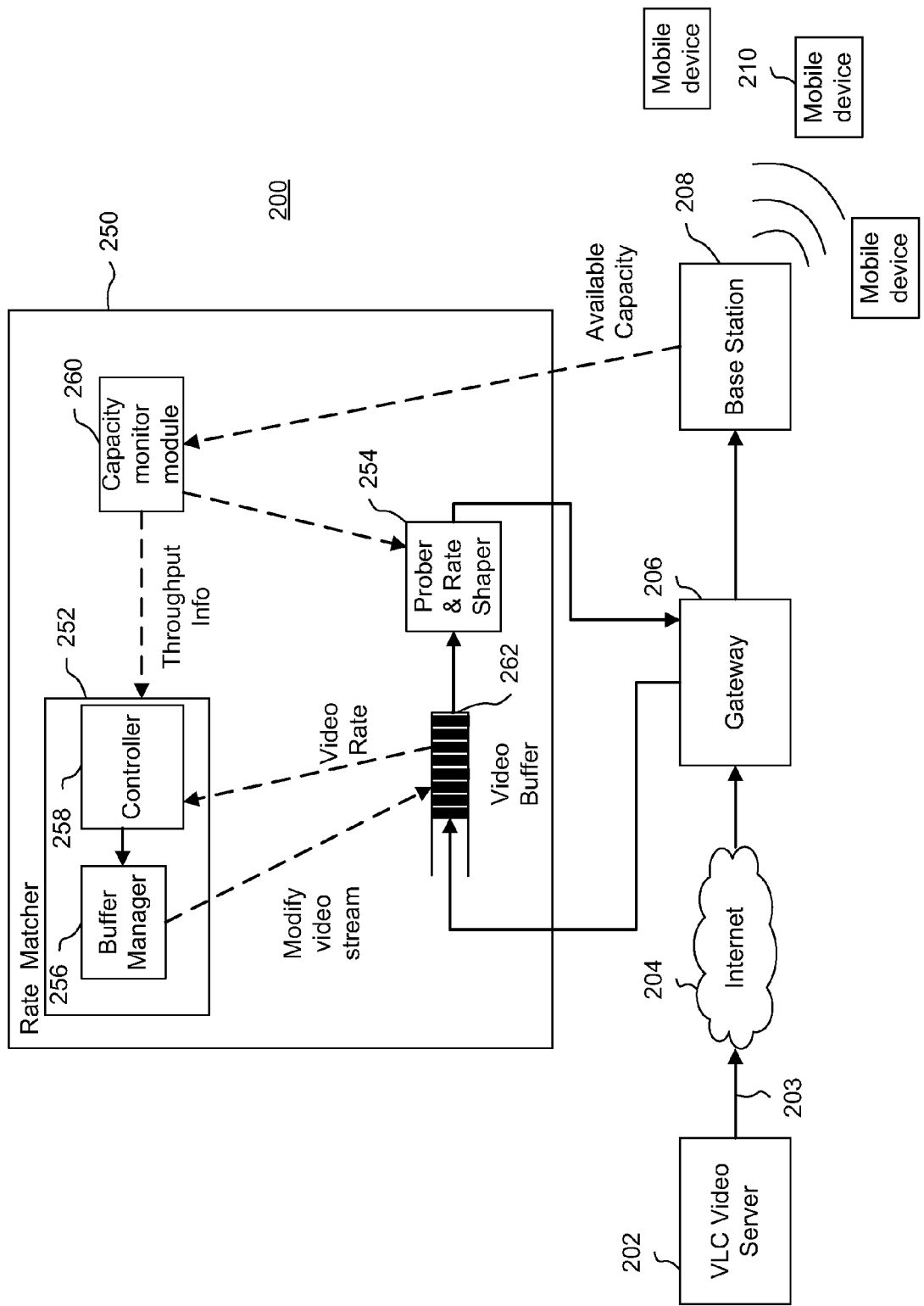
FIG. 2 is a block/flow diagram of an exemplary rate matching and rate shaping system in accordance with one exemplary embodiment of the present invention.

With reference now to FIG. 2, an exemplary MESA or control unit embodiment 250 of the present invention can be employed at a gateway between a wireless network and a wired wide area network, as illustrated by system 200 in FIG. 2. The exemplary system 200 may include streaming server 202, which in this example is a variable length coding (VLC) video server that transmits a video stream across links 203 to mobile devices 210 through gateway 206 situated between an internet network 204 and a base station 208 of a wireless network. As shown in FIG. 2, the video stream may be passed through MESA system 250, which in turn may dynamically adapt the video stream and/or video transmission rate to the variable wireless data link throughput or capacity between base station or access point 208 and users 210. In particular, the MESA system 250 may employ a rate matcher 252 and/or a prober and rate shaper 254 to modify the video stream and/or the video transmission rate. However, it should be understood that the MESA system 250 can include one of or both rate matcher 252 and the prober and rate shaper 254 in accordance with various exemplary embodiments of the present invention.

The rate matcher or rate matching module 252 can employ controller 258 to determine, for every new frame arrival (i.e. the arrival of all packets of the new frame) into the video buffer 262, the estimated time of decoding each frame at the client or mobile device 210 based on the current wireless channel capacity received from the capacity monitor module 260. Using a controller 258, the rate matcher 252 may define a per-frame metric to judge whether the incoming frames meet their play out or decoding deadlines or if adjustments should be made. If the deadline is not met by any high priority frame, the buffer manager 256, in response to commands issued by the controller 258, can modify the video stream so that the wireless data link between base station or access point 208 and a client or mobile device 210 can support the video stream. For example, low priority frames in video buffer 262 that have earlier decoding deadlines at a receiver can be dropped to make room for high priority frames. In addition, the capacity monitor module 260 can periodically estimate the available capacity on the wireless link. It should be noted that the capacity monitor module 260 can be incorporated into the rate matcher 252 or the prober and rate shaper 254 in alternative embodiments of the present invention.

The prober and rate shaper 254 can be configured to dequeue the video buffer 262 at the rate permitted by the instantaneous wireless channel capacity in order to avoid buffer overflow at the base station and minimize losses due to any mismatch between the wired and wireless capacities that the edge service bridges, as discussed in more detail below. Further, the video buffer 262 can be a per-flow buffer of frames ordered by an earliest-deadline-first policy that can pre-buffer the initial frames of a video session for a short duration before transmission. The deadline corresponds to the time by which a decoder in client or mobile device 210 should decode a frame to ensure that display of the video is uninterrupted. Delaying initial frame transmission by a few hundred milliseconds, for example, is helpful in making effective rate matching decisions.

For each flow, the intermediate buffer 262 may temporarily store packets of the data stream arriving from the wired interface and may initially delay the transmission by a B amount of time. Flow can correspond to a user datagram protocol (UDP) data connection carrying video data between the source and the user. The flow can be identified using the internet protocol (IP) and the transport headers of packets through the five-tuple including the source anti-destination addresses and ports, and the protocol. Effectively, the first packet reaches the client B units of time later than it otherwise would without the buffer. Because frame deadlines are relative to their previous frames, the video buffer can have a positive effect of increasing the deadlines of each frame by B. While this approach has minimal impact when the capacity is sufficient or higher than the incoming video rate (and thereby causing buffer underflow), it may lead to increased flexibility of selecting which packets to transmit on the wireless link when the capacity is insufficient to service the video stream. Note that for this reason, this approach is not equivalent to simply increasing the receiver buffer by the same amount B, which does not permit for selection of which packets to transmit or drop.

While higher values of B lead to improved smoothing of fluctuations and permit relatively more effective rate matching, they also lead to increased initial wait time in video streaming and to continually delayed transmissions in the case of video conferencing, which could annoyance to users. Hence, B can be restricted to a few hundred milliseconds to keep its impact low. For calculating the frame deadlines, the receiver buffer size can be set either by making a conservative estimate based on commonly used values or by employing signaling messages between the client and the server at a video proxy.

It should also be noted that exemplary embodiments of the present invention can employ application awareness mechanisms to effectively manage resources in in-network solutions. Such awareness can be achieved, for example, either through deep packet inspection with an application-level proxy or through explicit application extensions on the source with the expectation that the extensions can be used to manage resources at other network elements on the path to the clients. With regard to the latter approach, three extensions on the video server can be made to enable appropriate awareness for efficient resource management: packet marking, separating composite packets and separating voice and/or video into different packets.

For packet marking, the video source may mark packets with appropriate priorities under different modalities of video coding, such as H.264 AVC (advanced video coding) or SVC (scalable video coding). In exemplary implementations, the priorities can be marked such that 1 represents highest priority, where the priority decreases with increasing value of the marks. For example, for H.264/MPEG-4 AVC, packets may be marked as 1 for I frames, 2 for P frames, and 3 for B frames. For SVC, the base layer may be marked as 1, and the subsequent lower priority layers may be marked with increasing values. Numbering in this way ensures scalability of the approach to an arbitrary number of priority levels. These marks can be included, for example, in the TOS (type of services) field of the IP header of each packet.

Moreover, as noted above, composite packets composing different frames may be separated by a source to facilitate identification of frame boundaries. In other words, the video source can construct packets such that no packets belong to more than one frame type. This helps to ensure that part of a high priority frame that is aggregated with a previous low priority frame is not dropped. In addition, because voice or audio frames are often merged with video frames due to their small size, exemplary embodiments of the present invention may separate audio frames from video frames to prevent the loss of audio data due to the dropping of a low-priority frame.

It should be understood that each of the elements of MESA control unit 250 may be entirely hardware or including both hardware and software elements. In a preferred embodiment, the present invention is implemented in hardware and software, which includes but is not limited to firmware, resident software, microcode, etc. In addition, embodiments of the present invention may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 3:
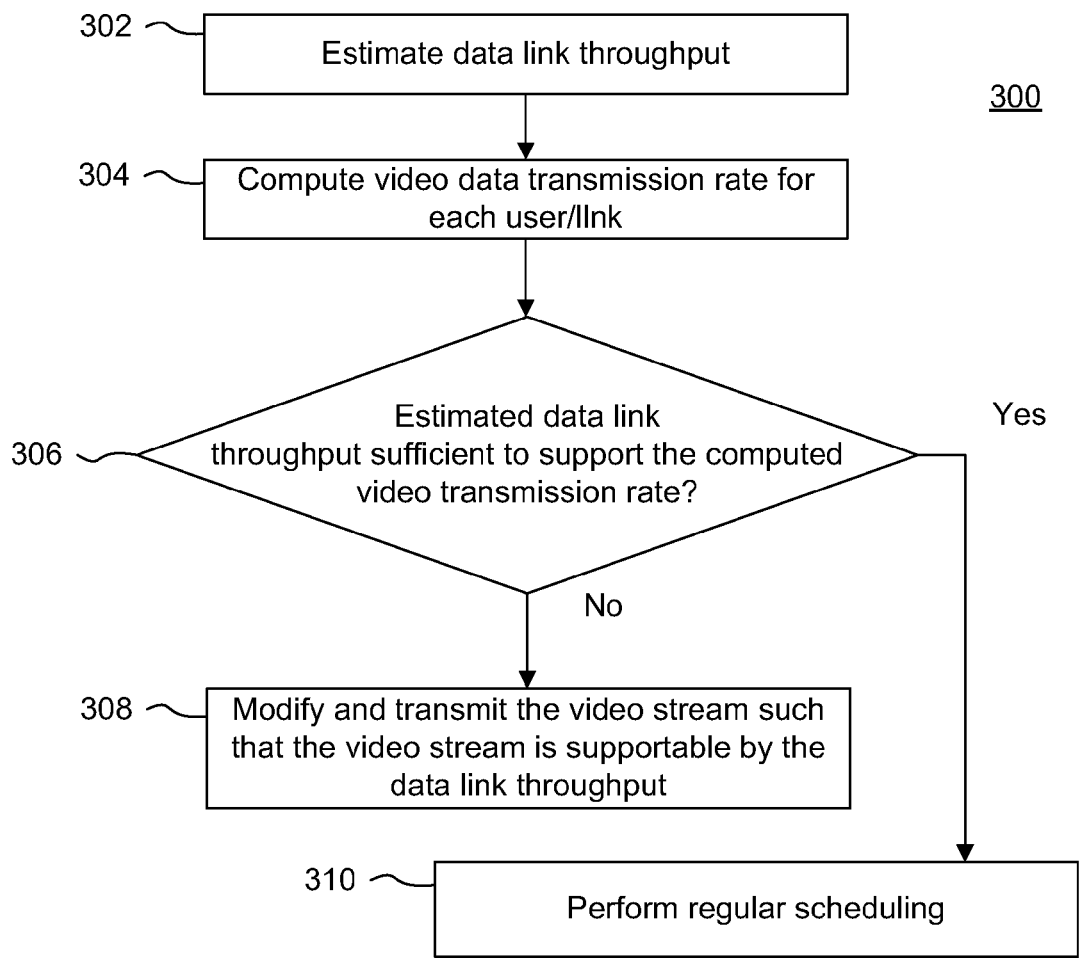
FIG. 3 is a block/flow diagram of an exemplary method for adapting the transmission of a video stream to the variable capacity of a data link in accordance with one exemplary embodiment of the present invention.

Referring now to FIG. 3 with continuing reference to FIG. 2, a method 300 for adapting the transmission of a video stream to the variable capacity of a data link in accordance with one exemplary embodiment of the present invention is illustrated. Method 300 may begin at step 302 in which the capacity monitor module 260 estimates a wireless data link throughput for each user or client. Estimation of incoming video data rate wireless data link throughput or capacity is discussed in more detail below.

At step 304, the controller 258 can compute a video transmission rate for each user or link by determining an incoming video data rate. Here, the video data rate corresponds to the rate needed to satisfy the deadlines of all incoming video frames. In certain embodiments, step 304, and steps 306 and 308 of method 300, can be implemented only when the wireless data link is operating at saturation capacity. To estimate the incoming rate, the controller 258 may consider frames in the intermediate buffer 262 whose deadline is in the future and may sort them in the order of their deadlines, as mentioned above. The deadline here refers to the decoding deadline, which is the minimum of the display deadlines of all dependent frames. Frames with expired deadlines may be dropped, as they will not be useful at the receiver both for displaying and for decoding other dependent frames. To illustrate the difference between display and decoding deadlines, consider four frames I, B, B, P that are to be displayed at time instances 1, 2, 3 and 4, respectively. The source transmits them in the order I, P, B, B for ease of decoding; in general, I is independently decodable, P is dependent on the previous I or P frame, and B frames depend on previous P and/or B frames. Hence, even though the display deadline of P is 4, the decoding deadline of P is 2 to ensure that the subsequent B frames are timely decoded. Table 1, below, describes the deadlines for the four-frame example.

TABLE 1

| I | P | B | B | | |
|---|---|---|---|---|---|
| 1 | 4 | 2 | 3 | → | Display deadlines |
| 1 | 2 | 2 | 3 | → | Decoding deadlines |

Returning to the computation of the video transmission rate by the controller 258, for the jth frame in the buffer 262, let $T_j$ be the deadline and $L_j$ be the size of the frame at deadline $T_j$. If t is the current time, then the maximum incoming instantaneous video transmission rate $R_i$ for a user or link i is $$R_i = \max_k \frac{\sum_{j=1}^{k} L_j}{(T_k - t)} \quad (1)$$

Thus, the controller 258 may use equation (1) to compute a video transmission rate for each user or link. Here, the term $$\sum_{j=1}^{k} L_j$$

represents the total sizes of frames that should be transmitted by time $T_k$.

Figure 4:
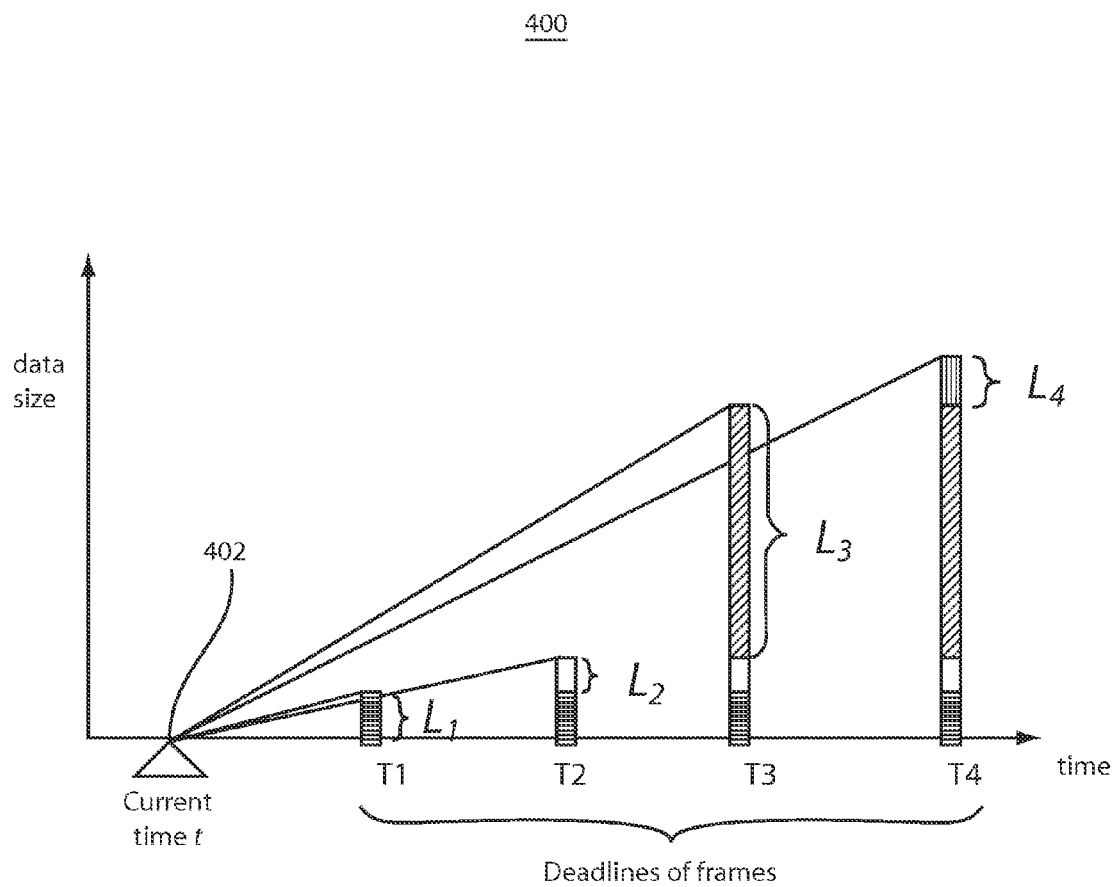
FIG. 4 is a graph illustrating the dependence of a video transmission rate based on frame decoding deadlines and sizes of frames in accordance with one exemplary embodiment of the present invention.

To better illustrate an exemplary process of determining a video transmission rate, reference is now made to FIG. 4, depicting a plot 400 of the total amount of data that a decoder should receive by each frame deadline for a set of frames. In the example of FIG. 4, the set of frames consist of four frames, denoted frames 1-4; however, the set of frames can be any number of frames depending on design choice. Thus, frames 1-4 respectively have frame deadlines at T1-T4, measured from a current time and frame sizes of $L_1$-$L_4$. As shown by equation (1), the instantaneous rate for any frame is determined by $$\frac{\sum_{j=1}^{k} L_j}{(T_k - t)},$$

where k=1 for frame 1, k=2 for frame 2, and so on. Thus, the instantaneous rate for any frame is obtained by accumulating the size of a given frame with the sizes of preceding frames in the set that are arranged in accordance with corresponding frame deadlines at a receiver. As shown in FIG. 4, the total amount of data that should be received by T4 is the accumulated frame sizes of $L_1$-$L_4$, while the total amount of data that should be received by T1 is simply the frame size of $L_1$. To determine the video transmission rate, the controller selects the highest instantaneous rate of the set of frames.

It should be noted that in accordance with the definition of a video transmission rate in equation (1), the maximum network capacity needed to ensure all frames meet their deadlines can be dependent on any frame in the buffer, and not necessarily the last frame. For example, in FIG. 4, the slope of the lines determines the rate constraint for a particular frame and its predecessors to meet their deadlines. The higher the slope, the higher the rate constraint. Clearly, the third frame determines the maximum rate needed at the current time instant t. Note that dropping earlier frames reduce the slope for the later frames.

Returning to FIG. 3, the method may proceed to step 306, in which the controller 258 may determine whether the estimated wireless data link throughput or capacity for a user or data link obtained at step 302 is sufficient to support the computed video transmission rate for the corresponding user or data link. For example, the controller 258 can determine that the estimated data link capacity is insufficient to support the video transmission rate if the video transmission rate exceeds the available data link capacity. If the video transmission rate is supportable by the data link capacity, then regular scheduling may proceed at step 310 and thereafter method 300 can be repeated for the next set of frames.

In response to determining that the data link throughput or capacity is insufficient to support the video transmission rate, the method can proceed to step 308 in which the video stream can be modified and transmitted to a user on the data link such that the video stream is supportable by the data link throughput. For example, the controller 258 can instruct the buffer manager 256 to drop video frames or layers of frames so that the video transmission rate is at or under the data link capacity. In an exemplary implementation, all packets belonging to a video frame chosen for dropping are dropped. However, it should be understood that dropping frames or layers are only examples of modifying the video stream and that the video stream can be modified in other ways to reduce the video transmission rate or the amount of data transmitted to a receiver.

With regard to dropping frames, it is preferable to transmit a frame completely or drop it completely rather than transmitting partial frames. For example, partially received frames render a distorted picture, whereas a dropped frame manifests as a jump, which may or may not be perceivable by people. In one exemplary embodiment, video frames that are considered for rate-matching can be prioritized and dropped in the increasing order of their priority. For non-scalable MPEG video, B-frames can have lower priority than P-frames, which in turn, can have lower priority than I-frames:

1. Among B-frames, those with earliest deadlines are dropped first.
2. Among P-frames, those with the least number of dependent frames are dropped first.

Both of the above design choices cause minimal impact on the video quality for a given number of bytes dropped. Similarly, for scalable video, priority of layers can be assigned by the video source so as to optimize the video quality at the time of dropping. Further, priority of layers can be determined based on their temporal, spatial and quality levels.

Returning to data link capacity estimation at step 302, due to fluctuating channel conditions, it is generally not possible to directly determine how much capacity is available for a link at any instant of time. "Capacity," as referred to herein, is the capacity that is achievable by a link under different conditions, such as modulation rate, mobility, etc., and not necessarily the theoretical capacity. One indirect approach for estimating capacity comprises using the immediate past to predict the future capacity. Capacity estimation on a wireless channel based on history can be performed in several ways, depending on the medium access technology, the hardware, and the relevant protocol standards. In accordance with one exemplary embodiment of the present invention, two functions at_saluration( ) and get_available_rate( ) that returns the capacity of the channel at a particular instant can be abstractly defined and can be implemented in different ways according the environment in which the MESA system is deployed. Thus, the exemplary embodiment can apply to different types of network environments.

Figure 5:
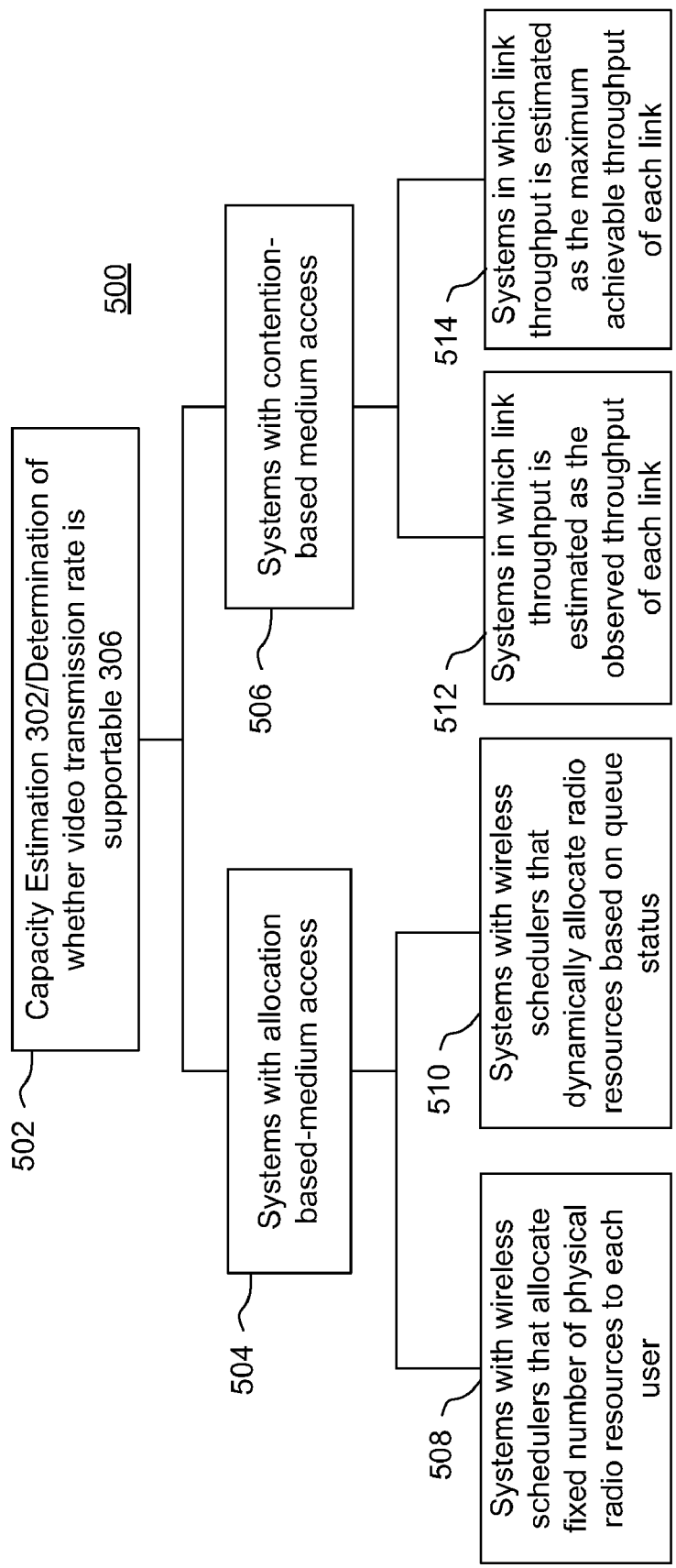
FIG. 5 is a block diagram illustrating exemplary wireless networks in which variations of embodiments of the present invention can be implemented.

With reference now to FIG. 5, a chart 500 illustrating different types of communication systems and how variations of exemplary embodiments of the present invention can be implemented in such systems is provided. In particular, variations with respect to capacity estimation at step 302 and determination of whether the video transmission rate is supportable at step 306, both of which are represented by block 502, are described. It should be understood that method 300 and each of the variations discussed with respect to FIG. 5 can be performed for a plurality of n data links. In addition, each data link i can be used to service a different user or client i 210.

As shown in chart 500, exemplary embodiments can be distinguished between systems with allocation based-medium access 504 and systems with contention-based medium access 506. Examples of allocation based systems include 3G/4G wireless networks, such as WiMAX networks. Conversely, a WiFi network is an example of a contention based system.

With regard to allocation based systems, the slotted structure of systems such as WiMAX renders capacity estimation simple, as the capacity can be readily derived from the radio resource parameters maintained by the base stations, which can be accessed via http and snmp from an ASN (access service network) gateway. In exemplary embodiments, two parameters provided by the base station can be used to estimate the available wireless capacity for a flow. The first parameter: Available Radio Resource DL provides an estimate of the total down-link spare capacity in the base station as a percentage of the average number of empty slots over the total available slots in the last few WiMAX OFDMA frames. The second parameter: MAC Throughput-MS, provides an estimate of the total bytes successfully transmitted to a mobile station for a specific service flow. Based on these two parameters, Algorithms 1 and 2, shown in Tables 2 and 3 below, represent the instantiations of at_saturation and get_available_rate functions for WiMAX. The function at_saturation may return true if the available resources are less than 5%. Algorithm 2 may run as a daemon on an ASN gateway to periodically calculate the current MAC (media access control) throughput for the given flow.

TABLE 2

Algorithm 1 at_saturation( ) for WiMAX

1: $AR_{DL}$ ← snmp_query(Available_Resources_DL,BSID)
2: return ($AR_{DL}$ < 5%)

TABLE 3

Algorithm 2 get_available_rate( ) for WiMAX

1: BYTES ← snmp_query (MAC-Throughput_MS,SFID)
2: RATES ← (BYTES -LAST-BYTES)/TIME
3: SLEEP TIME
4: LAST_BYTES ← BYTES Referring again to chart 500 of FIG. 5 with continuing reference to FIG. 3, procedures for estimating channel capacity at step 302 and determining whether the video transmission rate is supportable at step 306 in allocation-based systems can be different for different types of systems. For example, allocation based systems can include systems 508 with wireless schedulers in base stations or access points (APs) that allocate a fixed number of physical radio resources to each user and systems 510 with wireless schedulers in the base stations that dynamically allocate radio resources based on queue status and optionally based on channel conditions.

For the former systems 508, the capacity monitor module 260 can estimate the scheduled throughput or capacity $C_i'$ for user or data link i at step 302 as follows:

$$C_i' = \frac{(B \times D) \times R_F \times \log_2 M}{T} \quad (2)$$

where B is the number of resource blocks (RB) allocated to user i, D is the number of data subcarriers per RB, $R_F$ is the FEC (forward error correction) code rate, M is the modulation order employed by user i, and T is the transmission frame duration. Equation (2) should be employed if retransmission is not considered. If re-transmission is considered, the scheduled throughput for user i is $C_i=C_i'/N$, where $C_i'$ is calculated in equation (2), and N is the average number of transmissions attempted, including the first transmission and all re-transmissions, before a packet is successfully transmitted. In addition, for systems 508, in which the scheduled throughput for each link is estimated, the controller 258 can determine whether the video transmission rate is supportable at step 306 by comparing each video incoming video transmission rate $R_i$ and scheduled throughput $C_i$ individually for each user or data link i. If $R_i > \gamma C_i$, where $\gamma \approx 1$ is a tunable parameter, the video stream should be modified at step 308 as discussed above.

For systems 510 with wireless schedulers in the base stations that dynamically allocate radio resources based on queue status and optionally based on channel conditions, the capacity monitor module 260 can estimate the maximum throughput of each user or data link at step 302 by computing the maximum throughput $C_i'$ of user i, except that B is now the total number of physical resource blocks. This procedure is employed if re-transmissions are not considered. If considering re-transmission, the maximum throughput $C_i$ is still computed as $C_i = C_i'/N$. Further, for systems 510, in which the maximum throughput for each link is estimated, the controller 258 can determine whether the video transmission rate is supportable at step 306 by determining whether there exists a time or frequency allocation ($t_i$, i=1, ..., n) such that $$\sum_i t_i \leq 1 \quad (3)$$
$$R_i \leq t_i C_i$$

where $C_i$, i=1, ..., n) is the maximum achievable throughput vector and $R_i$, i=1, ..., n is the incoming video transmission rate vector. It should be noted that $t_i$ represents the fraction of physical resources allocated to user i. To solve the problem, the controller 258 can compute $$w = \left( \sum_{i=1}^{n} \frac{R_i}{C_i} \right)^{-1}.$$

If w≧1, the conditions in Eq. (3) can be satisfied. Therefore, if w<1, or w<1−δ for a small value δ to tolerate some estimation errors and to make the method more robust, the video stream should be modified at step 308 as discussed above. In this case, the achievable data link throughput or capacity for user i is $wR_i$.

Similar to system 504, procedures for estimating channel capacity at step 302 and determining whether the video transmission rate is supportable at step 306 in contention based systems 506 can also differ for different types of systems. For example, contention-based systems can include systems 512 where link throughput is estimated as the observed throughput of each link and systems 514 where the link throughput is estimated as the maximum achievable throughput of each link.

For systems 512, estimation can account for contentions from both neighbor APs and different flows in the same AP and is normally performed above MAC layers. The capacity monitor module 260 can measure the observed throughput of each link and can compute the exponential weighted moving average. The measurement can be done above MAC layers.

Figure 6:
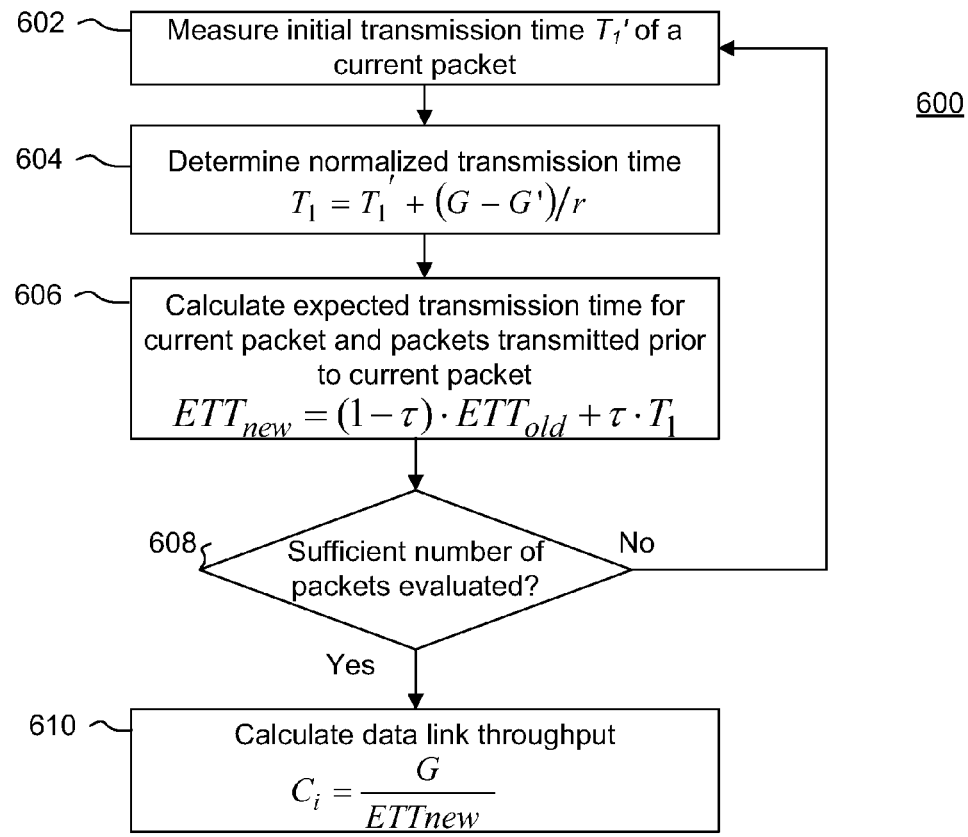
FIG. 6 is a block/flow diagram of a method for determining data link throughput that is based on observed throughput.

Referring now to FIG. 6, with continuing reference to FIGS. 2, 3 and 5, the capacity monitor module 260 can determine the data link throughput or capacity estimation for systems 512 at step 302 by performing method 600. Here, a packet with size G' is transmitted and $T_1'$ is the duration from the time that the packet enters the MAC layer to the time that ACK for this packet is received from the MAC layer. It should be noted that multiple re-transmissions may occur in $T_1'$. Method 600 may begin at step 602 in which the capacity monitor module 260 may measure an initial transmission time ($T_1'$) of a current packet of size G'. At step 604, the capacity monitor module 260 can determine a normalized transmission time ($T_1$) for the current packet by calculating $T_1 = T_1' + (G−G')/r$, where G is a packet size to which all packet size values may be normalized and is chosen to be a large enough value to be greater than all possible values of G' and where r is the physical transmission rate on the data link. At step 606, the capacity monitor module 260 can update or calculate an expected transmission time, $ETT_{new}$, for the current packet and packets transmitted prior to the current packet, where $ETT_{new} = (1−\tau) \cdot ETT_{old} + \tau \cdot T_1$, $ETT_{old}$ is the expected transmission time for packets transmitted prior to the current packet, and τ is a constant between 0 and 1. Preferably τ is a small value. Thereafter, the method may proceed to step 608 in which the capacity monitor module 260 determines whether a sufficient number of packets have been evaluated to obtain the observed throughput of a particular user or data link i. For example, in accordance with one exemplary embodiment, twenty packets can be a sufficient number of packets. If a sufficient number of packets has not been evaluated, then steps 602-606 are repeated to update the ETT. Otherwise, at step 610, the capacity monitor module 260 calculates or estimates the observed throughput of the particular user or data link i as $$C_i = \frac{G}{ETTnew}.$$

It should be noted that, here, the ETT is a continually estimated parameter. Thus, the determination in step 608 should return a "no" only upon initialization.

With regard to determining whether the video transmission rate is supported by the data link capacity at step 306, systems 512 may perform the same operations discussed above with regard to systems 508, in which the controller 258 may determine that the video stream should be modified if $R_i > \gamma C_i$.

Turning now to contention based systems 514 in which the link throughput is estimated as the maximum achievable throughput of each link, it should be noted that such estimation may account for contentions from neighboring APs but not from other flows in the same AP. In addition, the capacity monitor module 260 can estimate the maximum throughput $C_i$ of a user by measuring the ETT of a packet over the air. ETT can be calculated here as the moving average of the time needed to transmit a packet with fixed size G over the air. Further, the capacity monitor module 260 can calculate the maximum throughput for a particular user or data link i in exactly the same way in which the observed throughput of the particular user or data link i is calculated in systems 512, except that $$C_i = \frac{G}{ETTnew}$$

is now the maximum throughput for a user or data link i. Moreover, to determine whether the video transmission rate is supportable by the data link capacity at step 306, systems 514 can perform the same operations discussed above with regard to systems 510, where the controller 258 determines whether equation (3) is satisfied.

As noted above, other exemplary aspects of the present invention are directed to rate shaping, which can be employed to prevent unnecessary packet drops and bursty traffic resulting from the capacity mismatch between wired networks and wireless networks. Thus, exemplary rate shaping methods and systems described herein can be used to minimize packet drops at a wireless base station due to any mismatch in capacity. This approach contrasts with prior rate shaping methods discussed above, which simply determine priorities for dropping packets. To base rate shaping on the variable capacity of a wireless channel, the shaper described herein below may behave differently in two wireless channel states: saturated and unsaturated. Difference in saturation of the wireless channel has thus far not been exploited in the previous approaches. In addition, a joint probing mechanism may be integrated into the shaper. The two-state joint probing and shaping methods and systems described herein can enable rapid convergence to the appropriate shaper rate setting. Further, the transitions from one state to another can also be tailored to permit rapid convergence to the correct rate value during incoming traffic fluctuations and capacity fluctuations. This solution leads to higher quality of traffic shaping for different traffic types, including video transmission, thereby improving user experience. The shapers described herein can be applied in any edge service that is deployed at or near the wired-wireless transition point.

Returning to the control unit system 250 of FIG. 2, the prober and rater shaper 254 can be configured to manage the transmission rate of data to users 210 and minimize losses due to any mismatch between wired and wireless capacities. Further, by appropriately shaping the data transmission rate for the wireless network in accordance with the available capacity, the prober and rate shaper can help avoid buffer overflow at the base station or access point. In particular, the prober and shaper 254 can dequeue the video buffer at a rate that is at most equal to the available wireless channel capacity. However, it is often difficult to determine how much capacity is freely available in wireless networks and how much of it is usable by the particular flow. This is true irrespective of the specific technology, such as WiFi and WiMAX.

To overcome this challenge, the prober and shaper can apply an indirect approach of determining capacity using history-based prediction, where, for example, the capacity is deemed to be at least as much as the achieved throughput, denoted $A_r$, in the preceding interval. This $A_r$ can be the same as $C_i$ determined at step 610 for contention based systems such as WiFi, and the same as $C_i'$ for allocation based systems 508. As discussed herein below, the shaper can use the term S is used to represent the shaper rate at which the video buffer is dequeued. Specifically, the shaper can be based on two states, saturated or unsaturated, of the wireless channel. As stated above, a technology specific definition of at_satuation can determine the state that the shaper should be in. Thus, saturation can be determined for different wireless networks in technology-specific ways. One approach for estimated channel conditions is described further herein below with respect to WiFi and WiMAX networks. In each of the two states, the shaper rate is set as shown in the FIG. 7.

Figure 7:
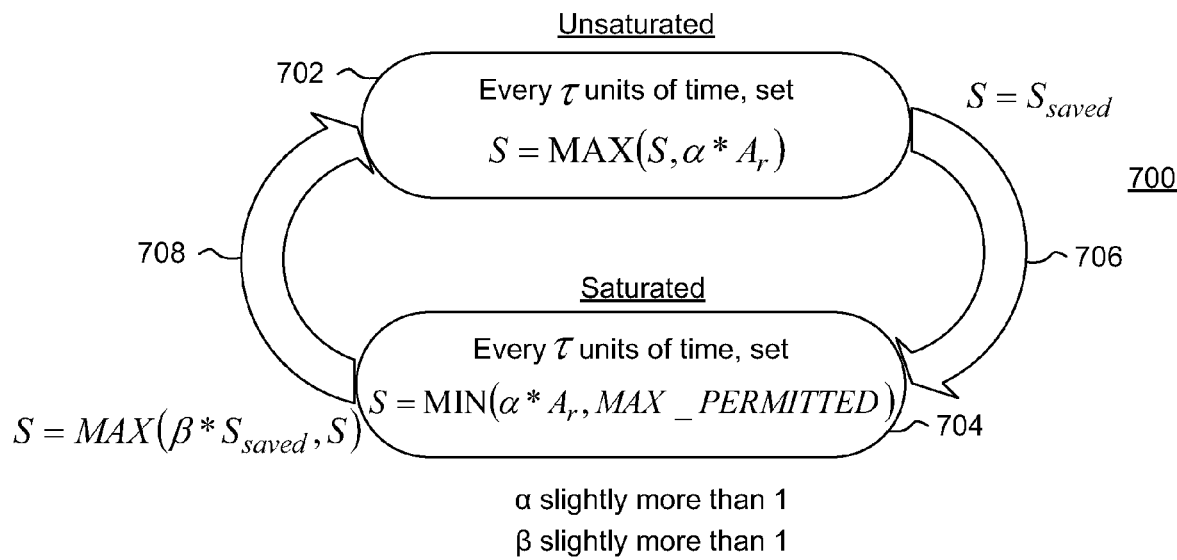
FIG. 7 is a state diagram illustrating a probing and rate shaping method in accordance with an exemplary embodiment of the present invention.

FIG. 7 is a state diagram 700 illustrating an exemplary probing and rate shaping method in accordance with an exemplary embodiment of the present invention. Firstly, as noted above, the prober and shaper 254 can assume that the available capacity is at least as much as the throughput or rate $A_r$ obtained in the previous time interval. Secondly, the shaper can set the rate at least a little over $A_r$, to ensure that a little more traffic is sent to probe for more capacity, if available. As shown in FIG. 7, the term S to represent the shaper rate at which the buffer is dequeued.

In the unsaturated state 702 of the prober and shaper 254, the shaper rate S is set as S=MAX(S,α*$A_r$) every τ units of time. Thus, when the link is not saturated, the shaper rate is maintained a little higher than the available rate by multiplying the available rate $A_r$ with α>1. In certain exemplary implementations, α can range between 1 and 1.1. This way of probing ensures that the shaper rate is elevated if more capacity is both available and needed. If capacity is available but not needed, due, for example, to the low traffic rate itself, the shaper is maintained at its current rate, as the estimate of available capacity is lower due to traffic rate decrease (and hence wrong).

In the saturated stated 704, the prober and shaper 254 sets the shaper rate S at S=MIN(α*$A_r$,MAX_PERMITTED). Thus, when the link is saturated, the shaper rate may be set to a little more than the available rate, as long as the maximum permitted rate, MAX_PERMITTED, is not exceeded. The maximum permitted rate, and also α, is a design parameter that is dependent on the wireless technology employed. For example, in technologies such as WiMAX, video traffic is classified as RTPS (real time polling services), and the RTPS traffic class has a maximum permitted (or sustained) rate for each flow. Hence, using MAX_PERMITTED, the shaper can ensure that the maximum sustained rate is not exceeded to avoid packet drops at the base station, which can lead to loss of high priority frames. It should also be noted that although τ and α are the same τ and α parameters used in the unsaturated state 702, τ and α can be different for the two states 702 and 704.

Separating the two states permits the shaper to be very aggressive and permits high burstiness of traffic when the channel is unsaturated, i.e. when the channel is under-utilized. When the channel is saturated, the shaper is set to smooth the traffic to a maximum of the sustained rate promised.

According to exemplary aspects of the present invention, the transitions between the states and the rates set therein can be configured so that they are smooth in that they do not overreact to minor fluctuations. For example, in the transition 706 between the unsaturated state and the saturated state due to momentary channel fluctuations, induced, for example, by user mobility, fading and shadowing, the capacity can sharply drop for a short while. Thus, to avoid overreaction to short changes, the prober and rate shaper 254 can apply the last shaper rate, $S_{saved}$, in the unsaturated state: S=$S_{saved}$. Further, in the transition between the saturated state and the unsaturated state, the prober and rate shaper 254 can set the shaper rate to the maximum of the current rate and β times the last saved rate, $S_{saved}$, in the preceding unsaturated state: S=MAX(β*$S_{saved}$,S). Selecting β<1 ensures that the shaper rate does not transition between saturated and unsaturated states too frequently.

In order to determine when the data link capacity or throughput is saturated or unsaturated for transition purposes, an accurate estimation of the capacity should be employed. As noted above, estimation of channel capacity can be tailored to the specific wireless technology in which the MESA control unit is utilized. Particular examples pertaining to WiMAX networks and WiFi networks are discussed herein below. However, it should be understood that other approaches for channel capacity estimation can be employed.

For WiMAX networks, the allocation is based on frequency sub-channels and timeslots. Thus, if the current slots are fully utilized, the channel can be considered in saturation; otherwise, the channel can be considered unsaturated. The value of $A_r$ can then be estimated using the number of bytes transferred in the last time interval. The specific value of the time interval can, of course, be configurable by a network administrator.

For WiFi networks, where the allocation is contention based, the capacity monitor module 260 or the prober and rate shaper 254 can determine the saturation condition and $A_r$ in an indirect manner. Firstly, it is assumed here that the value of $A_r$ is accurate only when the channel is actually in saturation. Secondly, it is also assumed that $A_r$ is an overestimate of the available capacity when the channel is not in saturation. Hence, when the channel is not saturated, the shaper can probe more aggressively than in the saturated state for estimating the available capacity.

Figure 8:
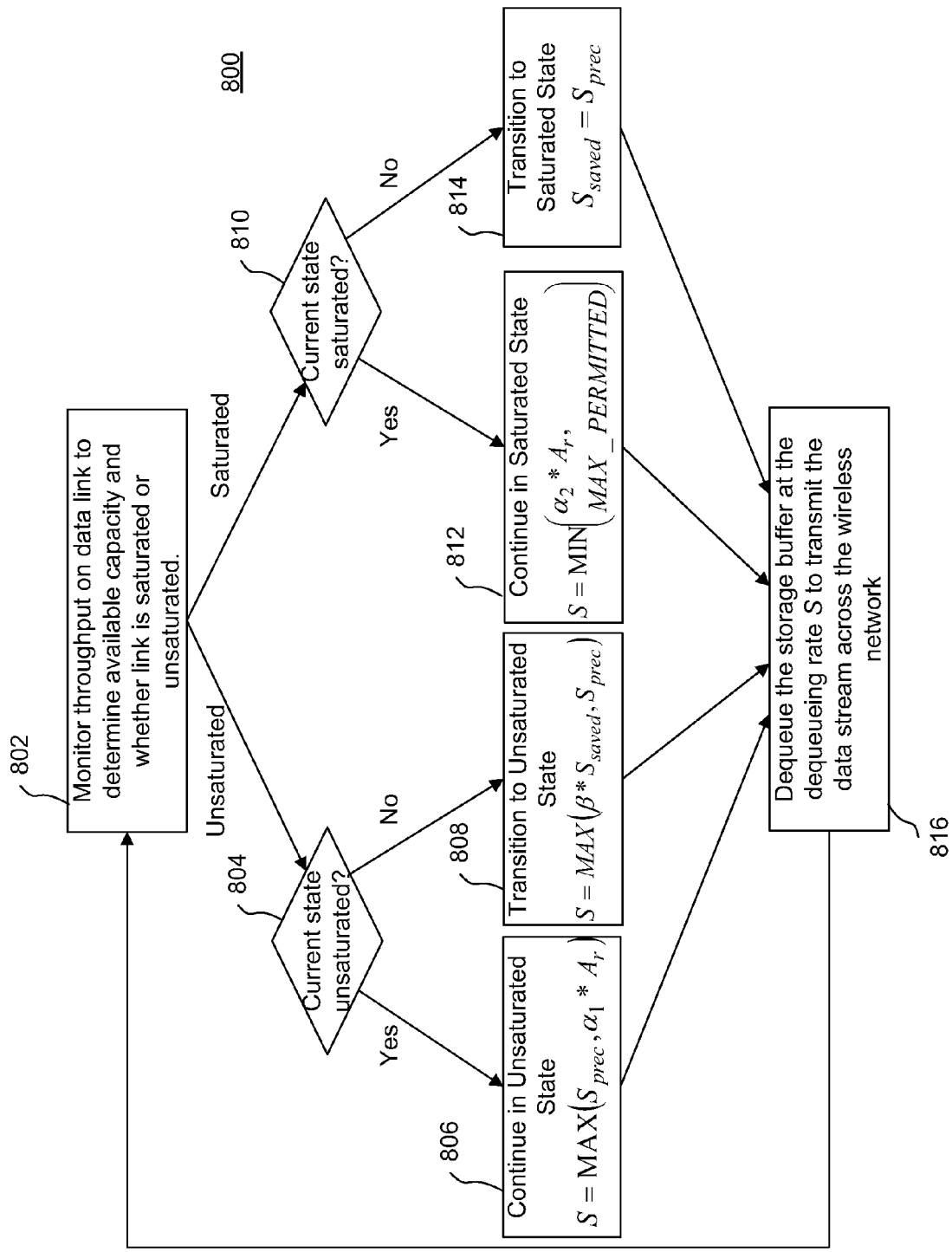
FIG. 8 is a block/flow diagram of a method for transmitting a video stream or a portion of a video stream based on the variable capacity of a data link in accordance with one exemplary embodiment of the present invention.

Turning now to FIG. 8 with continuing reference to FIG. 2, a method 800 for transmitting at least a portion of a video stream based on the variable capacity of a data link in accordance with one exemplary embodiment of the present invention is illustrated. It should be understood that all aspects discussed above with respect to the state diagram and the parameters referred to therein can be employed in method 800. Moreover, while the data transmitted is described herein as video data, the probing and rate shaping methods described herein can apply to any type of data.

Method 800 can begin at step 802, in which the capacity monitor module 260 may monitor throughput on a data link in the wireless network on a time interval τ to determine an available capacity on the data link and to determine whether the data link is unsaturated or saturated, as discussed above. For example, the available capacity can correspond to $A_r$ and can be estimated using procedures described above with respect to FIG. 6 or with respect to equation (2) and systems 508. In addition, the saturation condition can be technology-specific and can be based on, for example, a determination of whether all active current slots or resource blocks are utilized, as discussed above.

If the data link is unsaturated, then the method may proceed to step 804 in which the prober and rate shaper 254 can be informed of the state of the data link by the capacity monitor module 260 and in which the prober and rate shaper 254 can determine whether its current state is saturated. The next time interval is assumed to begin here, at step 804. However, when the time intervals are set is an arbitrary design choice. If the current state of the prober and rate shaper 254 is unsaturated, then the method may proceed to step 806 in which the prober and rate shaper 254 may continue in the unsaturated state. For example, the prober and rate shaper 254 may set the dequeueing rate, S, as the maximum value between the dequeueing rate, $S_{prec}$, in the preceding or last time interval and a capacity rate $\alpha_1 * A_r$ that is a fraction above the available capacity, $A_r$, on the data link in the preceding or last time interval, τ, as discussed above. Mathematically, the prober and rate shaper 254 may set the dequeueing rate as $S=MAX(S_{prec}, \alpha_1 * A_r)$. As noted above, $\alpha_1$ may be greater than 1. The method may then to step 816, in which the prober and rate shaper 254 can dequeue the storage buffer 262 at the dequeueing rate S to transmit the data stream across the wireless network to the base station or access point servicing one or more users. The method may return to step 802 in which the capacity monitor module 260 can determine the available capacity on the data link on the current time interval and can determine the saturation state of the data link and the method may be repeated thereafter.

Returning to step 804, if the data link is unsaturated and the prober and rate shaper 254 is in the saturated state, the method may proceed to step 808 in which the prober and rate shaper 254 may transition from the saturated state to the unsaturated state. As discussed above, upon transitioning to the unsaturated state, the prober and rate shaper 254 may set the dequeueing rate as the maximum value between the dequeing rate, $S_{prec}$, in a preceding time interval in which the data link is saturated and a transition rate $\beta * S_{saved}$ that is a fraction below the dequeing rate, $S_{saved}$, at a preceding time interval in which the data link is unsaturated. In other words, $S=MAX(\beta * S_{saved}, S_{prec})$. As discussed further herein below, $S_{saved}$ can be saved in step 814, the last step in which the prober and rate shaper 254 transitioned from the unsaturated state to the saturated state. In addition, β may be less than 1 and may be specific to the particular wireless technology and configuration employed. Thereafter, the method may proceed to step 816 in which the prober and rate shaper 254 may dequeue the storage buffer at the dequeueing rate S to transmit the data stream across the wireless network to the base station or access point 208. The prober and rate shaper 254 may then perform step 802 and repeat method 800.

Referring again to step 802, discussed initially above, if the data link is saturated, the method may proceed to step 810, in which the prober and rate shaper 254 can be informed of the state of the data link by the capacity monitor module 260 and in which the prober and rate shaper 254 can determine whether its current state is saturated. Similar to step 804, the next time interval is assumed to begin at step 810. If the current state of the prober and rate shaper 254 is saturated, then the method may proceed to step 812 in which the prober and rate shaper 254 may continue in the saturated state. For example, the prober and rate shaper 254 may set the dequeueing rate, S, as the minimum value between a predetermined maximum rate, MAX_PERMITTED, and a capacity rate, $\alpha_2 * A_r$, that is a fraction above the available capacity, $A_r$, on the data link in the preceding or last time interval, τ, as discussed above. In other words, $S=MIN(\alpha_2 * A_R, MAX\_PERMITTED)$. As noted above, $\alpha_2$ may be greater than 1 and may be the same as or different from $\alpha_1$. Thereafter, the method may proceed to step 816, in which the prober and rate shaper 254 can dequeue the storage buffer 262 at the dequeueing rate S to transmit the data stream across the wireless network to the base station or access point servicing one or more users. The method may return to step 802 and may be repeated thereafter, as discussed above.

With reference again to step 810, if the data link is saturated and the current state of the prober and rate shaper 254 is unsaturated, then the prober and rate shaper 254 may perform step 814, where it transitions from the unsaturated state to the saturated state. As discussed above, upon transitioning to the saturated state, the prober and rate shaper 254 may save the dequeueing rate, $S_{prec}$, of the preceding or last time interval for use in the transition between the saturated state and the unsaturated state. For example, the prober and rate shaper 254 may set $S_{saved}=S_{prec}$ and $S_{saved}$ may be used in transition step 808, discussed above. Thereafter, the method may proceed to step 816 in which the prober and rate shaper 254 may dequeue the storage buffer 262 in accordance with the rate $S_{saved}$ for transmission across the wireless network to base station or access point 208. The method may then return to step 802 and repeat, as stated above.

It should be noted that the use of two different states affords several benefits, such as allowing for condition-specific shaper rate settings. In addition, the use of the term alpha ensures a controlled probing of the channel for available capacity and also avoids a priority inversion problem with multi-priority flows. Moreover, the specific operations during state transitions ensures quicker convergence to the proper shaper rate setting even in the presence of fine timescale fluctuations of channel conditions. Also, the use of the term beta ensures that the shaper does not flip-flop between unsaturated and saturated states continuously.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmitting at least a portion of a video stream based on the variable capacity of a data link comprising:

estimating a data link throughput;

computing a video transmission rate by determining an instantaneous rate for each frame in a set of frames of the video stream and selecting a highest instantaneous rate among the instantaneous rates, wherein an instantaneous rate for a given frame is determined by accumulating the size of the given frame with sizes of preceding frames in the set that are arranged in accordance with corresponding frame deadlines at a receiver;

in response to determining that the estimated data link throughput is insufficient to support the video transmission rate, modifying and transmitting the video stream such that the video stream is supportable by the data link throughput; and calculating $$R_i = \max_k \frac{\sum_{j=1}^{k} L_j}{T_k - t},$$

wherein $R_i$ is the video transmission rate for a user i, $L_k$ is the size of the given frame, $T_k$ is the frame deadline of the given frame, $L_j$ is the size of a frame in the set with a frame deadline that is at or precedes $T_k$ and t is a current time.

2. The method of claim 1, wherein said transmitting is performed in a communications system that allocates a fixed number of resource blocks to each user and wherein said estimating further comprises calculating $$C_i' = \frac{(B \times D) \times R_F \times \log_2 M}{T},$$

wherein $C_i'$ is the data link throughput for a user i, B is the number of resource blocks allocated to the user i, D is the number of data subcarriers per resource block, $R_F$ is an FEC code rate employed by the user i, M is a modulation order employed by the user i, and T is a transmission frame duration.

3. The method of claim 1, wherein said transmitting is performed in a communications system that allocates a fixed number of resource blocks to each user and employs retransmissions and wherein said estimating further comprises calculating $$C_i = \frac{(B \times D) \times R_F \times \log_2 M}{T \times N},$$

wherein $C_i$ is the data link throughput for a user i, B is the number of resource blocks allocated to the user i, D is the number of data subcarriers per resource block, $R_F$ is an FEC code rate employed by the user i, M is a modulation order employed by the user i, and T is a transmission frame duration and N is the average number of transmissions attempted to successfully transmit a packet.

4. The method of claim 1, wherein said transmitting is performed in a communications system that dynamically allocates resource blocks to each user and wherein said estimating further comprises calculating $$C_i' = \frac{(B \times D) \times R_F \times \log_2 M}{T},$$

wherein $C_i'$ is the data link throughput for a user i, B is the total number of all resource blocks, D is the number of data subcarriers per resource block, $R_F$ is an FEC code rate employed by the user i, M is a modulation order employed by the user i, and T is a transmission frame duration.

5. The method of claim 1, wherein said transmitting is performed in a communications system that dynamically allocates resource blocks to each user and employs retransmissions and wherein said estimating further comprises calculating $$C_i = \frac{(B \times D) \times R_F \times \log_2 M}{T \times N},$$

wherein $C_i$ is the data link throughput for a user i, B is the total number of all resource blocks, D is the number of data subcarriers per resource block, $R_F$ is an FEC code rate employed by the user i, M is a modulation order employed by the user i, and T is a transmission frame duration and N is the average number of transmissions attempted to successfully transmit a packet.

6. The method of claim 1, wherein said transmitting is performed in a communication system employing a contention-based allocation scheme and wherein said estimating further comprises measuring an initial transmission time of a current packet of size G', determining a normalized transmission time ($T_1$) for the current packet by calculating $T_1 = T_1' + (G-G')/r$, wherein $T_1'$ is a duration from the time the current packet of size G' is transmitted to the time an acknowledgement for the current packet is received, G is a packet size that is greater than G', and r is the physical transmission rate on the data link, calculating an expected transmission time ($ETT_{new}$) for the current packet and packets transmitted prior to the current packet, wherein $ETT_{new} = (1-\tau) \cdot ETT_{old} + \tau \cdot T_1$, $ETT_{old}$ is the expected transmission time for packets transmitted prior to the current packet, and τ is a constant between 0 and 1, and calculating $$C_i = \frac{G}{ETTnew},$$

where $C_i$ is the data link throughput.

7. The method of claim 1, wherein the data link throughput is an estimate of a scheduled throughput and wherein the method further comprises:

determining whether the estimated data link throughput is sufficient to support the video transmission rate for the data link by comparing the video transmission rate ($R_i$) to the scheduled throughput ($C_i$) and performing said modifying if $R_i$ is greater than $\gamma C_i$, wherein γ is a tunable parameter.

8. The method of claim 1, wherein the estimating and computing are performed for a plurality of n data links, wherein the data link throughput is the throughput of a given data link among the plurality of n data links, wherein each data link throughput is an estimate of the maximum throughput for the corresponding data link and wherein the method further comprises:

determining whether the estimated given data link throughput ($C_i$) is sufficient to support the video transmission rate ($R_i$) for the given data link by determining whether $$\sum_i^n t_i \leq 1 \text{ and } R_i \leq t_i C_i$$

are satisfied, wherein $t_i$ is a fraction of resources allocated to a user i employing the given data link.

9. The method of claim 1, wherein the modifying comprises dropping frames from the video stream until the video stream is supportable by the data link throughput such that lower priority frames are dropped prior to higher priority frames, wherein, if the video stream is a Moving Pictures Experts Group (MPEG) video stream, B-frames are dropped prior to P-frames, which are dropped prior to I-frames, wherein B-frames are prioritized in accordance with frame deadlines and P-frames are prioritized in accordance with the number of frames that are dependent thereon.

10. A method for transmitting at least a portion of a video stream based on the variable capacity of a data link comprising:

estimating a data link throughput;

computing a video transmission rate by determining an instantaneous rate for each frame in a set of frames of the video stream and selecting a highest instantaneous rate among the instantaneous rates, wherein an instantaneous rate for a given frame is determined by accumulating the size of the given frame with sizes of preceding frames in the set that are arranged in accordance with corresponding frame deadlines at a receiver; and in response to determining that the estimated data link throughput is insufficient to support the video transmission rate, modifying and transmitting the video stream such that the video stream is supportable by the data link throughput;

wherein said transmitting is performed in a communication system employing a contention-based allocation scheme and wherein said estimating further comprises measuring an initial transmission time of a current packet of size G', determining a normalized transmission time ($T_1$) for the current packet by calculating $T_1 = T_1' + (G-G')/r$, wherein $T_1'$ is a duration from the time the current packet of size G' is transmitted to the time an acknowledgement for the current packet is received, G is a packet size that is greater than G', and r is the physical transmission rate on the data link, calculating an expected transmission time ($ETT_{new}$) for the current packet and packets transmitted prior to the current packet, wherein $ETT_{new} = (1-\tau) \cdot ETT_{old} + \tau \cdot T_1$, $ETT_{old}$ is the expected transmission time for packets transmitted prior to the current packet, and $\tau$ is a constant between 0 and 1, and calculating $$C_i = \frac{G}{ETTnew},$$

where $C_i$ is the data link throughput.

11. A method for transmitting at least a portion of a video stream based on the variable capacity of a data link comprising:

estimating a data link throughput;

computing a video transmission rate by determining an instantaneous rate for each frame in a set of frames of the video stream and selecting a highest instantaneous rate among the instantaneous rates, wherein an instantaneous rate for a given frame is determined by accumulating the size of the given frame rich sizes of preceding frames in the set that are arranged in accordance with corresponding frame deadlines at a receiver;

in response to determining that the estimated data link throughput is insufficient to support the video transmission rate, modifying and transmitting the video stream such that the video stream is supportable by the data link throughput;

wherein the estimating and computing are performed for a plurality of n data links, wherein the data link throughput is the throughput of a given data link among the plurality of n data links, wherein each data link throughput is an estimate of the maximum throughput for the corresponding data link and wherein the method further comprises determining whether the estimated given data link throughput ($C_i$) is sufficient to support the video transmission rate ($R_i$) for the given data link by determining whether $$\sum_i^n t_i \leq 1 \text{ and } R_i \leq t_i C_i$$

are satisfied, wherein $t_i$ is a fraction of resources allocated to a user i employing the given data link.

* * * * *